(12) United States Patent
Detlefs et al.

(10) Patent No.: US 6,993,770 B1
(45) Date of Patent: Jan. 31, 2006

(54) LOCK FREE REFERENCE COUNTING

(75) Inventors: David L. Detlefs, Westford, MA (US); Paul A. Martin, Arlington, MA (US); Mark S. Moir, Somerville, MA (US); Guy L. Steele, Jr., Lexington, MA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 652 days.

(21) Appl. No.: 09/837,671

(22) Filed: Apr. 18, 2001

Related U.S. Application Data (60) Provisional application No. 60/261,633, filed on Jan. 12, 2001.

(51) Int. Cl.
   *G06F 9/54* (2006.01)
(52) U.S. Cl. .................................. 719/315; 707/103 Z
(58) Field of Classification Search ................ 719/312, 719/310, 313, 315; 707/103 R–103 Z
   See application file for complete search history.

(56) References Cited

U.S. PATENT DOCUMENTS

| | | | | |
|---|---|---|---|---|
| 4,775,932 A | * | 10/1988 | Oxley et al. ................. | 707/206 |
| 4,912,629 A | * | 3/1990 | Shuler, Jr. .................... | 707/206 |
| 6,144,965 A | * | 11/2000 | Oliver ......................... | 707/100 |
| 6,560,619 B1 | * | 5/2003 | Flood et al. ................. | 707/206 |
| 6,668,310 B2 | * | 12/2003 | McKenney .................. | 711/147 |
| 2001/0047361 A1 | | 11/2001 | Martin et al. | |
| 2001/0056420 A1 | | 12/2001 | Steele, Jr. et al. | |

OTHER PUBLICATIONS

Farook, Mohammad et al. "Managing Long Linked Lists Using Lock Free Techniques." Oct. 1998.*
Valois, John D. "Implementing Lock-Free Queues." Oct. 1994.*
Micahel, Maged M. "Safe Memory Reclamation for Dynamic Lock-Free Objects Using Atomic Reads and Writes." ACM. Jul. 21-24, 2002.*
Michael, Maged M. et al. "Non-Blocking Algorithms and Preemption Safe Locking on Multiprogrammed Shared Memory Multiprocessors." Mar. 1997.*
Stone, Janice M. "A simple and correct shared-queue algorithm using compare-and-swap." IEEE. May 1990.*
Michael, Maged M. et al. "Simple, Fast, and Practical Non-Blocking and Blocking Concurrent Queue Algorithms." Dec. 1995.*
Prakash, Sundeep et al. "Non-Blocking Algorithms for Concurrent Data Structures." Jul. 1, 1991.*
Valois, John D. "Lock-Free Linked Lists Using Compare-and-Swap." 1995.*
Chappell, David. "Understanding ActiveX and OLE." Microsoft Press, 1996, p. 51-52.*

(Continued)

*Primary Examiner*—Lewis A. Bullock, Jr.
(74) *Attorney, Agent, or Firm*—Zagorin O'Brien Graham LLP (57) ABSTRACT

We present a methodology for transforming concurrent data structure implementations that depend on garbage collection to equivalent implementations that do not. Assuming the existence of garbage collection makes it easier to design implementations of concurrent data structures, particularly because it eliminates the well-known ABA problem. However, this assumption limits their applicability. Our results demonstrate that, for a significant class of data structures, designers can first tackle the easier problem of an implementation that does depend on garbage collection, and then apply our methodology to achieve a garbage-collection-independent implementation. Our methodology is based on the well-known reference counting technique, and employs the double compare-and-swap operation.

28 Claims, 4 Drawing Sheets

OTHER PUBLICATIONS

Brown, Jeremy Hanford. "Memory Management on a Massively Parallel Capability Architecture." Dec. 3, 1999.*

Ben-Ari, Mordechai, "On-the-Fly Garbage Collection: New Algorithms Inspired by Program Proofs," Automata, Languages and Programming, 9th Colloquium, Lectures Notes in Computer Science, vol. 140, pp. 14-22, Springer-Verlag, Jul. 12-16, 1982.

Barnes, Greg, "A Method for Implementing Lock-Free Shared Data Structures," in *Proceedings of the 5th ACM Symposium on Parallel Algorithms and Architectures*, pp. 261-270, Velen, Germany, Jun. 1993.

Ben-Ari, Mordechai, "Algorithms for On-the-Fly Garbage Collection", ACM Transactions on Programming Languages and Systems, vol. 6, No. 3, Jul. 1984, pp. 333-344.

Detlefs, David, "Garbage Collection and Run-time Typing as a C++ Library," in *Proceedings of the 1992 Usenix C++ Conference*, Digital Equipment Corporation Systems Research Center, Jun. 18, 1992, 20 pp. (online) [downloaded from the internet Mar. 29, 2002: url:<http://citeseer.nj.nec.com/ellis93safe.html>].

DeTreville, John, "Experience with Concurrent Garbage Collectors for Modula-2+", *Digital Equipment Corporation Systems Research Center Tech Report*, No. 64, Nov. 22, 1990 (online) [downloaded from the internet Apr. 1, 2002: url: <ftp://gatekeeper:research.compaq.com/pub/DEC/SRC/research-reports/SRC-064.pdf>.

Herlihy, Maurice and Moss, J. Eliot B., "Transactional Memory: Architectural Support for Lock-Free Data Structures," Technical Report CRL 92/07, Digital Equipment Corporation, Cambridge Research Lab, 1993, pp. 289-300 (online) [downloaded from the internet Mar. 29, 2002: url: <http://www.cs.brown.edu/people/mph/isca93.html>].

Hesselink, W. H. and Grotte, J. F., "Waitfree distributed memory management by Create, and Read Until Deletion ({CRUD})," Dept. of Math. and Computing Science, University of Groningen, The Netherlands, pp. 1-21, Dec. 31, 1998, (online) [downloaded from the internet Mar. 29, 2002: url: <http://citeseer.nj.nec.com/groote98waitfree.html>].

Jones, Richard and Lins, Rafael, "Garbage Collection Algorithms for Automatic Dynamic Memory Management," John Wiley & Sons, Ltd. England, 1996, pp. 19-25, 200-202.

Shavit, Nir and Touitou, Dan, "Software Transactional Memory," Distributed Computing, Feb. 1997, Springer-Verlag, vol. 10(2), pp. 99-116.

van de Snepscheut, Jan L. A., "Algorithms for On-the-Fly Garbage Collection—Revisited," *Information Processing Letters*, vol. 24, No. 4, pp. 211-216, Elsevier Science Publishers, Mar. 2, 1987, The Netherlands.

* cited by examiner

```
class SNode {
1    class SNode *L, *R; valtype V;
2    SNode() {};
};

class Snark {
3    SNode *Dummy, *LeftHat, *RightHat;
4    Snark() {
5        Dummy = new SNode;
6        Dummy→L = Dummy;
7        Dummy→R = Dummy;
8        LeftHat = Dummy;
9        RightHat = Dummy;
     };
10   valtype pushRight(valtype v);
11   valtype pushLeft(valtype v);
12   valtype popRight();
13   valtype popLeft();
};
```

FIG. 3A

```
class SNode {
31   class SNode *L, *R; valtype V; long rc;
32   SNode() : L(Null), R(Null), rc(1) {};
};

class Snark {
33   SNode *Dummy, *LeftHat, *RightHat;
34   Snark() : Dummy(Null),
                LeftHat(Null), RightHat(Null) {
35       LFRCStoreAlloc(&Dummy, new SNode);
36       LFRCStore(&Dummy→L, Null);
37       LFRCStore(&Dummy→R, Null);
38       LFRCStore(&LeftHat, Dummy);
39       LFRCStore(&RightHat, Dummy);
     };
40   ~Snark() {
41       while(popLeft()!=EMPTYval);
42       LFRCStore(&Dummy, Null);
43       LFRCStore(&LeftHat, Null);
44       LFRCStore(&RightHat, Null);
     };
45   valtype pushRight(valtype v);
46   valtype pushLeft(valtype v);
47   valtype popRight();
48   valtype popLeft();
};
```

FIG. 4A

```
valtype Snark::pushRight(valtype v) {
14    SNode *nd = new SNode;
15    SNode *rh, *rhR, *lh;
16    if (nd == Null)
17        return FULLval;

18    nd→R = Dummy;
19    nd→V = v;
20    while (true) {
21        rh = RightHat;
22        rhR = rh→R;
23        if (rhR == rh) {
24            nd→L = Dummy;
25            lh = LeftHat;
26            if (DCAS(&RightHat, &LeftHat, rh, lh, nd, nd))
27                return OKval;
28        } else {
29            nd→L = rh;
30            if (DCAS(&RightHat, &rh→R, rh, rhR, nd, nd))
                    return OKval;
        }
    }
}
```

FIG. 3B

```
valtype Snark::pushRight(valtype v) {
49    SNode *nd = new SNode;
50    SNode *rh = Null, *rhR = Null, *lh = Null;
51    if (nd == Null) {
52        LFRCDestroy(rhR, nd, rh, lh);
53        return FULLval;
      }
54    LFRCStore(&nd→R, Dummy);
55    nd→V = v;
56    while (true) {
57        LFRCLoad(&RightHat, &rh);
58        LFRCLoad(&rh→R, &rhR);
59        if (rhR == rh) {
60            LFRCStore(&nd→L, Dummy);
61            LFRCLoad(&LeftHat, &lh);
62            if (LFRCDCAS(&RightHat, &LeftHat,
                          rh, lh, nd, nd)) {
63                LFRCDestroy(rhR, nd, rh, lh);
64                return OKval;
              }
        } else {
65            LFRCStore(&nd→L, rh);
66            if (LFRCDCAS(&RightHat, &rh→R, &rh→R,
                          rh, rhR, nd, nd)) {
67                LFRCDestroy(rhR, nd, rh, lh);
68                return OKval;
              }
        }
    }
}
```

FIG. 4B

LOCK FREE REFERENCE COUNTING

CROSS-REFERENCE TO RELATED APPLICATION(S)

This application claims benefit of U.S. Provisional Application No. 60/261,633, filed Jan. 12, 2001.

In addition, this application is related to U.S. Patent Application Publication No. U.S. 2001/0056420 A1 and U.S. Patent Application Publication No. U.S. 2001/0047361 A1.

BACKGROUND OF THE INVENTION

1. Field of the Invention

The present invention relates generally to coordination amongst execution sequences in a multiprocessor computer, and more particularly, to structures and techniques for facilitating non-blocking access to concurrent shared objects.

2. Description of the Related Art

It is well known that availability of automatic dynamic memory management facilities, often referred to as garbage collection (GC), can simplify the design of sequential implementations of data structures. Furthermore, availability of garbage collection facilities can simplify the handling of various synchronization issues in the design of concurrent data structures.

For example, concurrent data structure implementations for an execution environment that provides garbage collection can benefit from a free solution to the so-called ABA problem. The ABA problem arises when a data system fails to detect that a value changes (e.g., from A to B) and then changes back to its original value (i.e., A). For example, if a compare-and-swap-type operation (e.g., a CAS or DCAS operation) is about to operate on a pointer and the object to which it points is freed and then reallocated, then it is possible for the CAS or DCAS to succeed even though it should fail. In a proper implementation, this possibility should be prevented by ensuring that an object is not freed while an execution thread has pointers to it. Garbage collector implementations typically ensure such behavior, e.g., by stopping a thread and inspecting its registers and stack for pointers. However, in the absence of a garbage collector, responsibility for handling the ABA problem generally falls to the concurrent data structure implementation itself.

While use of a garbage-collected execution environment is possible in some situations, such an environment is not always available. For example, many common programming and execution environments do not support garbage collection. Second, even those environments that do support garbage collection typically employ excessive synchronization, such as locking and/or stop-the-world mechanisms, which impair scalability and may be impractical for certain applications. Finally, concurrent shared object implementations that depend on the existence of a garbage collection facility are generally not suitable for use in the implementation of the garbage collector itself.

In view of the above, structures and techniques are desired that would allow programmers to exploit the advantages of a garbage collected execution environment in the design of data structure implementations despite the absence of a garbage collection facility.

SUMMARY OF THE INVENTION

Accordingly, we have developed a methodology for transforming garbage collection-dependent algorithms and/or shared object implementations into a form that no longer presumes the existence of an independent, or execution environment provided, garbage collector. Transformed algorithms and shared object implementations provide explicit reclamation of storage using lock-free pointer operations. The transformations have been applied to lock-free algorithms and shared object implementations and preserve lock-freedom of such algorithms and implementations. As a result, existing and future lock-free algorithms and shared object implementations that depend on a garbage-collected execution environment can be exploited in environments that do not provide garbage collection. Furthermore, algorithms and shared object implementations that employ explicit reclamation of storage using lock-free pointer operations such as described herein may be employed in the implementation of a garbage collector itself.

While some realizations of the present invention include transformation techniques or facilities, others realizations include the lock-free implementations themselves (whether or not derived through such transformations). For example, some realizations include a shared object or data structure that employs lock-free pointer operations. Some realizations include multiprocessor systems and/or computer program products incorporating explicit reclamation of storage using lock-free pointer operations. In some multiprocessor environments, algorithms and/or shared object implementations employed by operating system or execution environment facilities (including, without limitation, garbage collection or other automatic dynamic memory management facilities) may exploit the techniques described herein to explicitly reclaim storage.

In one embodiment in accordance with the present invention, a method of providing storage reclamation in a multiprocessor computer system includes maintaining respective reference counts for shared objects, accessing pointers to the shared objects using lock-free pointer operations to coordinate modification of respective reference counts and freeing storage associated with a particular one of the shared objects only once the corresponding reference count indicates that the particular shared object is unreferenced. In some realizations, the lock-free pointer operations ensure that if a number of pointers referencing the particular shared object is non-zero, then so too is the corresponding reference count and that if no pointers reference the particular shared object, then the corresponding reference count eventually becomes zero. DCAS primitives, CAS primitives or other synchronization primitives are employed in some realizations of the lock-free pointer operations. Of course, the assertion (here and elsewhere) that the reference count eventually becomes zero assumes that no processes fail. If a process does fail, it can prevent storage from being reclaimed by failing to decrement a reference count to zero. Accordingly, some realizations may employ additional techniques such a second-tier garbage-collector or a specialized process failure handler to reclaim such storage.

In another embodiment in accordance with the present invention, a lock-free implementation of a concurrent shared object includes plural component shared objects encoded in dynamically-allocated shared storage and access operations. Prior to attempting creation or replication of a pointer to any of the component shared objects, the access operations increment a corresponding reference count, and upon failure of the attempt, thereafter decrement the corresponding reference count. Except when handling a pointer creation failure, the access operations decrement a particular reference count no earlier than upon destruction of a pointer to a corresponding one of the component shared objects. In some realizations, the access operations employ lock-free, reference-count-maintaining pointer operations, such as a lock-free, reference-count-maintaining load, a lock-free, reference-count-maintaining store, a lock-free, reference-count-maintaining copy, a lock-free, reference-count-maintaining destroy, a lock-free, reference-count-maintaining compare-and-swap (CAS) and/or a lock-free, reference-count-maintaining double compare-and-swap (DCAS).

In still another embodiment in accordance with the present invention, a method of transforming an implementation of a concurrent shared data structure from garbage collection-(GC-) dependent to GC-independent form includes associating a reference count with each shared object instance, modifying the implementation, if necessary, to ensure cycle-free garbage, replacing pointer accesses in the implementation with corresponding lock-free, reference-count-maintaining counterpart operations, and explicitly managing local pointer variables using a lock-free, reference-count-maintaining destroy operation that frees storage if a corresponding reference count has reached zero. In some realizations, the replacement of pointer accesses includes replacing an access that assigns a shared pointer value to a local pointer variable with a lock-free, reference-count-maintaining load operation, replacing an access that assigns a local pointer value to a shared pointer variable with a lock-free, reference-count-maintaining store operation, and/or replacing an access that assigns a local pointer value to a local pointer variable with a lock-free, reference-count-maintaining copy operation.

In some realizations, the method further includes generating a computer program product including a computer readable encoding of the concurrent shared data structure, which is instantiable in dynamically-allocated shared storage, the computer readable encoding further including functional sequences that facilitate access to the concurrent shared data structure and that include the lock-free, reference-count-maintaining counterpart operations.

In still yet another embodiment in accordance with the present invention, a computer program product includes a representation of a shared object that is instantiable as zero or more component objects in dynamically-allocated shared storage of a multiprocessor and at least one instruction sequence executable by respective processors of the multiprocessor. The instruction sequence implements at least one access operation on the shared object and employs one or more lock-free pointer operations to maintain reference counts for one or more accessed component objects thereof. The instruction sequence further implements explicit reclamation of the component objects, thereby freeing storage associated with a particular one of the component objects only once the corresponding reference count indicates that the particular component object is unreferenced. In some realizations, the component objects of the shared object are organized as a linked-list and the access operation supports concurrent access to the linked-list. In some variations, the computer program product at least partially implements a mutator that provides explicit reclamation of the dynamically-allocated shared storage. In some variations, the computer program product at least partially implements a garbage collector that reclaims shared storage dynamically-allocated for a mutator and, which employs the shared object in coordination thereof.

In still yet another embodiment in accordance with the present invention, an apparatus includes multiple processors, one or more stores addressable by the processors, one or more shared pointer variables accessible by each of the processors for referencing a shared object encoded in the stores, and means for coordinating competing access to the shared object. The means for coordinating competing access using one or more reference counts and pointer manipulations that employ one or more lock-free pointer operations to ensure that if the number of pointers the shared object is non-zero, then so too is the corresponding reference count and further that if no pointers reference the shared object, then the corresponding reference count eventually becomes zero. In some realizations, the apparatus further includes means for freeing the shared object only once the corresponding reference count indicates that the shared object is unreferenced.

BRIEF DESCRIPTION OF THE DRAWINGS

The present invention may be better understood, and its numerous objects, features, and advantages made apparent to those skilled in the art by referencing the accompanying drawings.

FIGS. 3A and 4A and FIGS. 3B and 4B are presented in side-by-side fashion to illustrate the correspondence.

The use of the same reference symbols in different drawings indicates similar or identical items.

DESCRIPTION OF THE PREFERRED EMBODIMENT(S)

Our techniques are based on reference counting, which persons of ordinary skill in the art will recognize as one of the classical methods of storage reclamation. See generally, Jones and Lins, *Garbage Collection: Algorithms for Automatic Dynamic Memory Management*, John Wiley & Sons Ltd. (1996), pp. 19–25 (reviewing reference counting). However, our techniques use a synchronization primitive, such as a double compare and swap (DCAS) operation, to update the reference count of an object atomically with a check that a pointer to the object still exists. By weakening the typical reference counting implementation invariant that reference counts record the exact number of pointers to an object, we are able to separate the updates of reference counts from the updates of the pointers themselves. This allows us to support strong synchronization operations, including CAS and DCAS, on pointers. In contrast, classical reference counting implementations for concurrent environments typically require the use of locks on all objects that might be shared between threads. See generally, Jones and Lins, pp. 200–202 (reviewing concurrent reference counting methods).

We have designed our methodology to preserve lock-freedom. That is, if a GC-dependent implementation is lock-free, then so too will be a GC-independent implementation derived using our methodology. In this regard, the assertion of lock-freedom may ignore certain operating system or execution environment provided facilities such as for creation and destruction of objects. For example, in many systems, malloc and free (or other similar facilities) are provided. Unfortunately, implementations of such facilities are often not lock-free, and therefore, strictly-speaking, implementations based thereon are not themselves lock-free. However, most production-quality malloc/free implementations do attempt to avoid contention for locks—for example, by maintaining separate allocation buffers for each thread—and therefore avoid most of the problems associated with locks. As a result, while some exploitations of the present invention build upon underlying facilities, which are truly lock-free, others need not. Accordingly, even concurrent shared object implementations for execution environments in which implementations of malloc, free or similar facilities are not, strictly speaking, lock-free derive substantial benefits from our techniques.

As used herein, an implementation of a concurrent data structure is said to be lock-free if it guarantees that in any execution, after a finite number of steps of one of its operations, some operation on the data structure completes. Of course, it is possible that the operating system, execution environment or garbage collector might prevent threads from executing any instructions, in which case, no operations will be completed on the data structure. However, this does not mean that the concurrent data structure implementation is not lock-free. Thus, it is not contradictory to talk about a lock-free GC-dependent concurrent data structure implementation, even in environments in which a garbage collector, operating system or execution environment facility is blocking. Lock-free programming is increasingly important for overcoming the problems associated with locking, including performance bottlenecks, susceptibility to delays and failures, design complications, and, in real-time systems, priority inversion.

Our methodology is based on the well-known garbage collection technique of reference counting. We refer to our methodology as LFRC (Lock-Free Reference Counting). In some realizations, each object includes or has an associated count of the number of pointers that reference it. Such objects are freed if and only if this count reaches zero. Persons of ordinary skill in the art will recognize that one reason that typical tracing-type garbage collectors "stop the world" (e.g., by suspending all mutator threads) is that some of these pointers can reside in registers and/or stacks and that discovery of these pointers may require operating system support. As a result, garbage collection is difficult to perform concurrently with execution of mutator threads. Accordingly, one of our goals is to enable programmers of multi-processor systems to take advantage of the simplicity afforded by the existence of automatic dynamic memory management, without having to use locks or stop-the-world techniques.

Figure 1A:
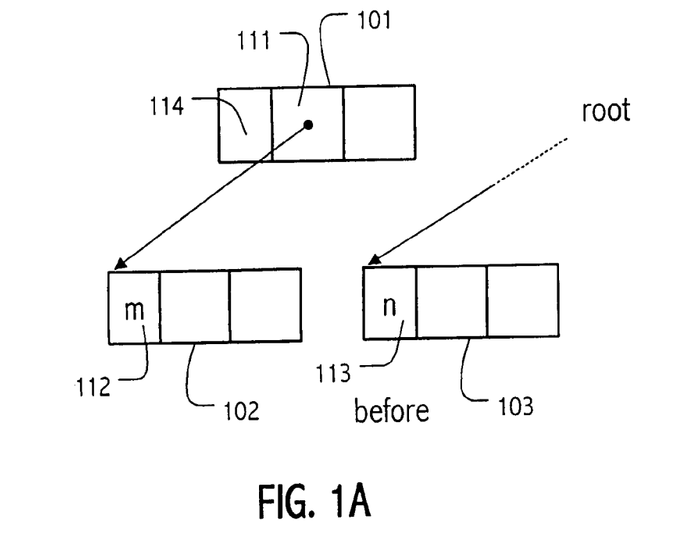
FIGS. 1A and 1B illustrate before and after states of a simple data structure in which reference counts are provided.
Figure 1B:
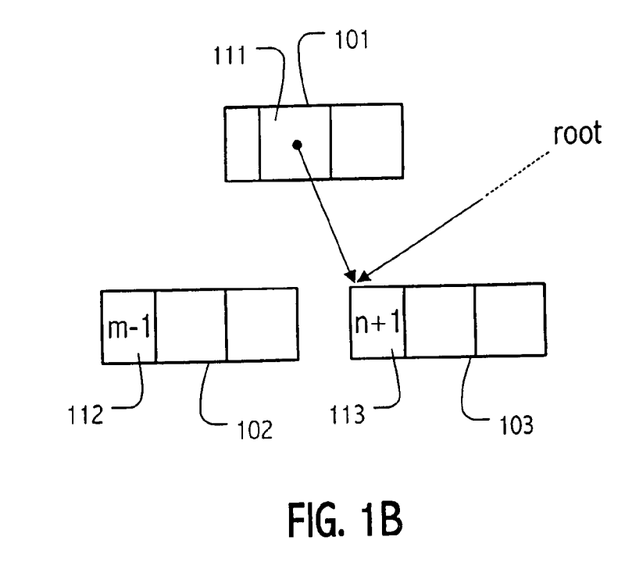

As an initial proposition, to maintain accurate reference counts, we would like to atomically create a pointer to an object and increment that object's reference count, and to atomically destroy a pointer to an object and decrement its reference count. FIGS. 1A and 1B illustrate appropriate reference count updates when a pointer value in field 111 of object 101 is changed to reference object 103 rather than object 102. FIG. 1A illustrates the pre-change states of object 101, 102 and 103, while FIG. 1B illustrates the post-change states. Reference count fields 112 and 113 of the respective objects are decremented and incremented accordingly. In this way, each object's reference count always accurately reflects the number of pointers to it. By freeing an object when and only when its reference count becomes zero, it is possible to ensure that objects are not freed prematurely, but that they are eventually freed when no pointers to the object remain.

The main difficulty that arises in the above-described approach is the need to atomically modify three separate memory locations, e.g., the pointer store and the reference count fields of the objects to which the store points both before and after update. This goal can be achieved using synchronization primitives to enforce atomicity. For example, in some realizations we assume the availability of compare-and-swap (CAS) and double compare-and-swap (DCAS) operations. Other realizations may employ other synchronization primitives or facilities such as those provided by transactional memory.

CAS operations atomically access a single memory location, while DCAS operations atomically access two independently-chosen memory locations. DCAS operations are well known in the art and have been implemented in hardware, such as in the Motorola 68040 processor, as well as through software emulation. Accordingly, a variety of suitable implementations exist and the descriptive code that follows is meant to facilitate later description of concurrent shared object implementations in accordance with the present invention and not to limit the set of suitable DCAS implementations. For example, order of operations is merely illustrative and any implementation with substantially equivalent semantics is also suitable.

```
boolean DCAS(val *addr1, val *addr2,
             val old1, val old2,
             val new1, val new2) {
    atomically {
        if ((*addr1==old1) && (*addr2==old2)) {
            *addr1 = new1;
            *addr2 = new2;
            return true;
        } else {
            return false;
        }
    }
}
```

The sequence of operations implementing the DCAS operation is executed atomically using support suitable to the particular realization. Persons of ordinary skill in the art will appreciate a variety of suitable implementations. For example, in some realizations, atomicity is provided using hardware support (e.g., as implemented by the Motorola 68040 microprocessor or as described in M. Herlihy and J. Moss, *Transactional memory: Architectural Support For Lock-Free Data Structures*, Technical Report CRL 92/07, Digital Equipment Corporation, Cambridge Research Lab, 1992, 12 pages) or using non-blocking software emulation (such as described in G. Barnes, *A Method For Implementing Lock-Free Shared Data Structures*, in *Proceedings of the 5th ACM Symposium on Parallel Algorithms and Architectures*, pages 261–270, June 1993 or in N. Shavit and D. Touitou, *Software transactional memory, Distributed Computing*, 10(2):99–116, February 1997). Although the above-referenced implementation is presently preferred, other DCAS implementations that substantially preserve the semantics of the descriptive code (above) are also suitable.

Unfortunately, even a DCAS operation is not strong enough to allow us to maintain reference counts that are accurate at all times. For example, referring to the illustration of FIGS. 1A and 1B, if a pointer value in shared memory (e.g., that stored in field 111 of object 101) points to object 102, and we change the pointer value to instead point to another object 103, then we would have to atomically (i) modify the pointer (i.e., the contents of field 111), (ii) increment reference count 113 of object 103 and (iii) decrement reference count 112 of object 102. However, it turns out that a weaker requirement on the reference counts suffices, and that this requirement can be achieved using a DCAS operation. This weakening is based on the insight that reference counts do not always need to be accurate. Instead, it is sufficient that if the number of pointers to an object is non-zero, then so too is its reference count, and that if the number of pointers is zero, then the reference count eventually becomes zero. These two requirements respectively guarantee that an object is never freed prematurely, and that the reference count of an object that has no pointers to it eventually become zero, so that it can be freed.

Furthermore, based on the above insight, it is safe for a thread to increment an object's reference count before creating a new pointer to it, provided that the thread eventually either creates the pointer or, if not, decrements the reference count to compensate for the previous increment. It is tempting to think that the weaker requirements can be achieved without resorting to use DCAS. However, when we load a pointer from a shared memory location, we need to increment the reference count of the object to which the loaded value points. If we can access this reference count only with a single-variable CAS operation, then there is a risk that the object will be freed before we increment the reference count, and that the subsequent attempt to increment the reference count will corrupt memory that has been freed, and potentially reallocated for another purpose. By using a DCAS operation, we can increment the reference count while atomically ensuring that a pointer to the object still exists.

Lock-Free Reference Counting

Some lock-free reference counting (LFRC) implementations in accordance with the present invention provide a set of pointer operations that mediate access and manipulation of pointers consistent with the goals described above. For example, an LFRC implementation may provide a set of operations that support loading, storing, copying, and destroying pointers. For many of the concurrent shared object implementations of interest, additional operations may be provided. For example, to support concurrent shared object implementations in which compare-and-swap (CAS) and double compare-and-swap (DCAS) constructs are employed to mediate concurrent access to the shared object, LFRC pointer operations that provide CAS and DCAS semantics may also be provided.

The description that follows focuses on implementations, techniques and methodologies that build upon an illustrative set of pointer operations by which load, store, copy, destroy, CAS and DCAS operations on pointers are supported. However, the particular set, while generally sufficient to support a wide range of concurrent data structure implementations, is merely illustrative. Based on the description herein, persons of ordinary skill in the art will appreciate implementations of suitable pointer operation sets in which access and manipulation of pointers is performed consistent with the goals described above. For example, some useful additional pointer operations include operations to facilitate passing pointers by value and operations that combine allocation and pointer initialization functions. Suitable pointer operation sets may include LFRC versions of other synchronization primitives, such as the load-linked (LL) and store-conditional (SC) synchronization primitives.

We present a methodology for transforming any garbage-collection-dependent concurrent data structure implementation (lock-free or otherwise) that satisfies the two criteria below into an equivalent implementation that does not depend on garbage collection.

1. LFRC Compliance The implementation does not access or manipulate pointers other than through a set of pointer operations that ensure that if the number of pointers to an object is non-zero, then so too is its reference count, and that if the number of pointers is zero, then the reference count eventually becomes zero. For example, compliance with such a criterion generally precludes the use of pointer arithmetic, unless the implementation thereof enforces the criterion. For example, in some implementations, arithmetic operations on pointers could be overloaded with compliant versions of the arithmetic operations. In an illustrative realization described below, an implementation of a concurrent shared object accesses and manipulates pointers only through a set of functions, procedures or methods (e.g., load, store, copy, destroy, CAS and/or DCAS operations) that ensure compliance.

2. Cycle-Free Garbage There are no pointer cycles in garbage. Note that, cycles may exist in the concurrent data structure, but not amongst objects that have been removed from the data structure, and which should be freed.

The transformation preserves lock-freedom. In particular, if the original implementation is lock-free, so too is the garbage-collection-independent algorithm produced by applying our methodology.

LFRC Operations—An Illustrative Set

Subject to the foregoing, an illustrative set of LFRC pointer operations is now described. As stated above, we assume that pointers in a data structure implementation under consideration are accessed only by means of these operations.

1. LFRCLoad (A,p)—A is a pointer to a shared memory location that contains a pointer, and p is a pointer to a local pointer variable. The effect is to load the value from the location pointed to by A into the variable pointed to by p.
2. LFRCStore (A,v)—A is a pointer to a shared memory location that contains a pointer, and v is a pointer value to be stored in this location.
3. LFRCCopy (p,v)—p is a pointer to a local pointer variable and v is a pointer value to be copied to the variable pointed to by p.
4. LFRCDestroy (v)—v is the value of a local pointer variable that is about to be destroyed.
5. LFRCCAS (A0,old0,new0)—A0 is a pointer to a shared memory location that contains a pointer, and old0 and new0 are pointer values. The effect is to atomically compare the contents of the location pointed to by A0 with old0 and to change these contents to new0 and return true if the comparison succeeds; if it fails, then the contents of the location pointed to by A0 are left unchanged, and LFRCCAS returns false.
6. LFRCDCAS (A0,A1,old0,old1,new0,new1)—A0 and A1 are pointers to shared memory locations that contain pointers, and old0, old1, new0, and new1 are pointer values. The effect is to atomically compare the contents of the location pointed to by A0 with old0 and the contents of the location pointed to by A1 with old1, to change the contents of the locations pointed to by A0 and A1 to new0 and new1, respectively, and to return true if the comparisons both succeed; if either comparison fails, then the contents of the locations pointed to by A0 and A1 are left unchanged, and LFRCDCAS returns false.

Figure 2:
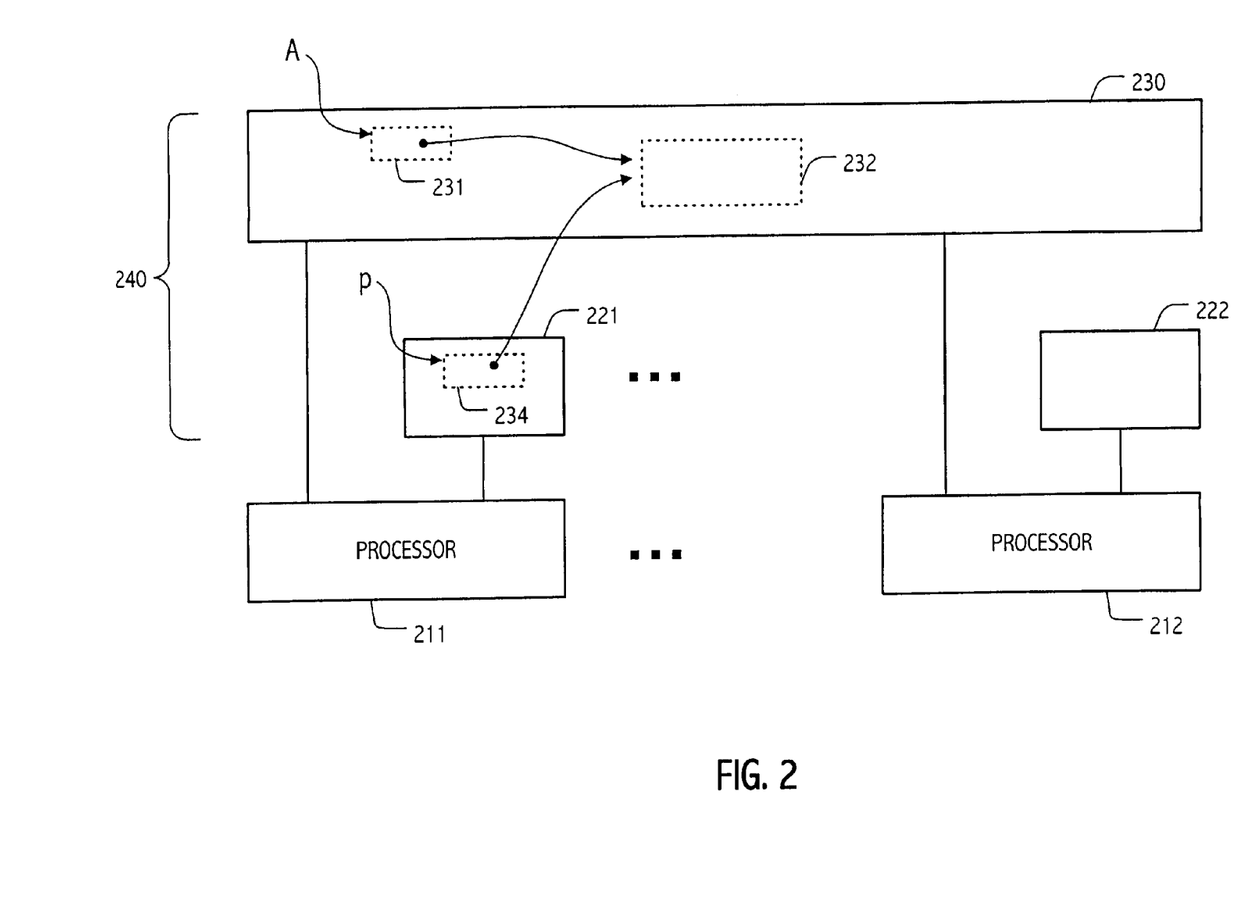
FIG. 2 depicts a shared memory multiprocessor configuration that serves as a useful illustrative environment for describing operation of some shared object implementations in accordance with the present invention.

FIG. 2 depicts a shared memory multiprocessor configuration in which the illustrated set of LFRC pointer operations may be employed. In particular, FIG. 2 depicts a pair of processors 211 and 212 that access storage 240. Storage 240 includes a shared storage portion 230 and local storage portions 221 and 222, respectively accessible by execution threads executing on processors 211 and 212. In general, the multiprocessor configuration is illustrative of a wide variety of physical implementations, including implementations in which the illustrated shared and local storage portions correspond to one or more underlying physical structures (e.g., memory, register or other storage), which may be shared, distributed or partially shared and partially distributed.

Accordingly, the illustration of FIG. 2 is meant to exemplify an architectural view of a multiprocessor configuration from the perspective of execution threads, rather than any particular physical implementation. Indeed, in some realizations, data structures encoded in shared storage portion 230 (or portions thereof) and local storage (e.g., portion 221 and/or 222) may reside in or on the same physical structures. Similarly, shared storage portion 230 need not correspond to a single physical structure. Instead, shared storage portion 230 may correspond to a collection of sub-portions each associated with a processor, wherein the multiprocessor configuration provides communication mechanisms (e.g., message passing facilities, bus protocols, etc.) to architecturally present the collection of sub-portions as shared storage. Furthermore, local storage portions 221 and 222 may correspond to one or more underlying physical structures including addressable memory, register, stack or other storage that are architecturally presented as local to a corresponding processor. Persons of ordinary skill in the art will appreciate a wide variety of suitable physical implementations whereby an architectural abstraction of shared memory is provided. Realizations in accordance with the present invention may employ any such suitable physical implementation.

In view of the foregoing and without limitation on the range of underlying physical implementation of the shared memory abstraction, LFRC pointer operations may be better understood as follows. Pointer A references a shared memory location 231 that contains a pointer to an object 232 in shared memory. One or more pointers such as pointer A is (are) employed as operands of the LFRCLoad, LFRCStore, LFRCCAS and LFRCDCAS operations described herein. Similarly, pointer p references local storage 234 that contains a pointer to an object (e.g., object 232) in shared memory. In this regard, FIG. 2 illustrates a state, *A == *p, consistent with successful completion of either a LFRCLoad or LFRCStore operation. In general, pointers A and p may reside in any of a variety storage locations. Often, both pointers reside in storage local to a particular processor. However, either or both of the pointers may reside elsewhere, such as in shared storage.

In our experience, the operations presented here are sufficient for many concurrent shared object implementations, but can result in somewhat non-transparent code. Accordingly, we have also implemented some extensions that allow more elegant programming and handle issues such as the pointer created by passing a pointer by value transparently. For example, 1. p=LFRCLoad2 (A)—A is a pointer to a shared memory location that contains a pointer, and p is a local pointer variable, where p is known not to contain a pointer (e.g., it has just been declared). The effect is to load the value from the location pointed to by A into p.

2. LFRCStoreAlloc (A, v)—A is a pointer to a shared memory location that contains a pointer, and v is a pointer value that will not be used (or destroyed) again. Accordingly, there is no need to increment a reference count corresponding to v. This variation is useful when we want to invoke an allocation routine directly as the second parameter, e.g., as LFRCStoreAlloc (&X, allocate_structure( )).

3. LFRCDCAS2 (A0,A1,old0,old1,new0,new1)—A0 is a pointer to a shared memory location that contains a pointer, A1 is a pointer to a shared memory location that contains a non-pointer value, old0 and new0 are pointer values, and old1 and new1 are values, e.g., literals, for which no reference counting is required.

4. LFRCPass (p)—p is a pointer value to be passed by value and for which a reference count should be incremented. This variation is useful when we want to pass p to a routine, e.g., as Example(, , . . . , LFRCPass (p)).

Based on the description herein, persons of ordinary skill in the art will appreciate variations of the described implementations, which may employ these and other extensions and/or variations on a set of supported pointer operations.

LFRC Methodology

Building on the previously described illustrative set of pointer operations, we describe now steps of a methodology for transforming a GC-dependent implementation into a GC-independent implementation. In general, these steps (with the possible exception of step 4) can be automated using facilities of an object-oriented language such as C++. Based on the description herein, persons of ordinary skill in the art will appreciate a variety of facilities that could be employed. See e.g., Detlefs, *Garbage Collection and Run-Time Typing as a C++ Library*, in *Proceedings of the 1992 Usenix C++ Conference*, pp. 37–56, 1992 (describing a suitable "smart pointer" technique). Nonetheless, presenting these steps explicitly makes our presentation clearer, and serves as a roadmap for exploitation of our methodology in non-object-oriented languages as well. Accordingly, one suitable transformation is as follows:

1. Add reference counts: Add a reference count field rc to each object type to be used by the implementation. This field should be set to 1 in a newly-created object (in an object-oriented language such as C++, initialization may be achieved through object constructors).

2. Provide an LFRCDestroy (v) function: Write a function LFRCDestroy (v) that accepts a pointer v to an object. If v is NULL, then the function should simply return; otherwise it should atormically decrement v->rc. If the reference count field becomes zero as a result, LFRCDestroy should recursively call itself with each pointer in the object, and then free the object. An example is provided below, and we provide a function (add_to_rc) for the atomic decrement of the rc field, so writing this function is straightforward. We employ this function only because it is the most convenient and language-independent way to iterate over all pointers in an object. Other implementations may provide similar facility using language-specific constructs.

3. Ensure no garbage cycles: Ensure that the implementation does not result in referencing cycles in or among garbage objects. This step may be non-trivial or even impossible for some concurrent data structure implementations. If this property cannot be achieved for a particular data structure, then it is not a candidate for applying our methodology. Note that, as illustrated below, the concurrent data structure may include cycles. However, storage no longer reachable should not.

4. Produce correctly-typed LFRC pointer operations: We have provided code for the LFRC pointer operations to be used in the example implementation presented in the next section. In this implementation, there is only one type of pointer. For simplicity, we have explicitly designed the LFRC pointer operations for this type. For other simple concurrent shared object implementations, this step can be achieved by simply replacing the SNode type used in this implementation with a new type. In algorithms and data structure implementations that use multiple pointer types, a variety of alternative implementations are possible. In general, operations may be duplicated for the various pointer types or, alternatively, the code for the operations may be unified to accept different pointer types. For example, in some realizations an rc field may be defined uniformly, e.g., at the same offset in all objects, and void pointers may be employed instead of specifically-types ones. In such realizations, definition of multiple object-type-specific LFRC pointer operations can be eliminated. Nonetheless, for clarity of illustration, an object-type-specific set of LFRC pointer operations is described below.

5. Replace pointer operations: Replace each pointer operation with its LFRC pointer operation counterpart. For example, if A0 and A1 are pointers to shared pointer variables, and x0, x1, old0, old1, new0, new1 are pointer variables, then replacements may be made as follows:

| Replaced Pointer Operation | LFRC Pointer Operation |
| --- | --- |
| x0 = *A0; | LFRCLoad(A0, &x0); |
| *A0 = x0; | LFRCStore(A0, x0); |
| x0 = x1; | LFRCCopy(&x0, x1); |
| CAS(A0, old0, new0) | LFRCCAS(A0, old0, new0) |
| DCAS(A0, A1, old0, old1, new0, new1) | LFRCCAS(A0, A1, old0, old1, new0, new1) |

Note that the table does not contain an entry for replacing an assignment of one shared pointer value to another, for example *A0=*A1. Such assignments are not atomic. Instead, the location pointed to by A1 is read into a register in one instruction, and the contents of the register are stored into the location pointed to by A0 in a separate instruction. This approach should be reflected explicitly in a transformed implementation, e.g., with the following code:

```
{
   ObjectType *x=NULL;
   LFRCLoad(A1,&x);
   LFRCStore(A0,x);
   LFRCDestroy(x);
}
``` or its substantial equivalent, whether included directly or using a "wrapper" function.

6. Management of local pointer variables: Finally, whenever a thread loses a pointer (e.g., when a function that has local pointer variables returns, so its local variables go out of scope), it first calls LFRCDestroy ( ) with this pointer. In addition, pointer variables are initialized to NULL before being used with any of the LFRC operations. Thus, pointers in a newly-allocated object should be initialized to NULL before the object is made visible to other threads. As illustrated in the example below, it is also important to explicitly remove pointers contained in a statically allocated object before destroying that object.

EXAMPLE

Transformation of a Concurrent Deque Implementation

In this section, we show how to use our methodology to construct a GC-independent implementation of a concurrent double-ended queue (deque) object, based on a GC-dependent implementation presented in greater detail in U.S. Patent Application Publication No. U.S. 2001/0056420 A1, entitled "LOCK-FREE IMPLEMENTATION OF CONCURRENT SHARED OBJECT WITH DYNAMIC NODE ALLOCATION AND DISTINGUISHING POINTER VALUE," naming Guy L. Steele Jr., Alexander T. Garthwaite, Paul A. Martin, Nir N. Shavit, Mark S. Moir and David L. Detlefs as inventors, and filed on even date herewith. The description, in the above-identified U.S. patent application Publication, of a deque object implementation (including supporting data structure representations and access operations) suitable for use in a garbage-collected storage environment is incorporated herein by reference in its entirety. Hereafter, a class of implementations patterned on such techniques is referred to variously as the "Snark" algorithm, data structure, access operations, implementation, etc.

Figure 3A:
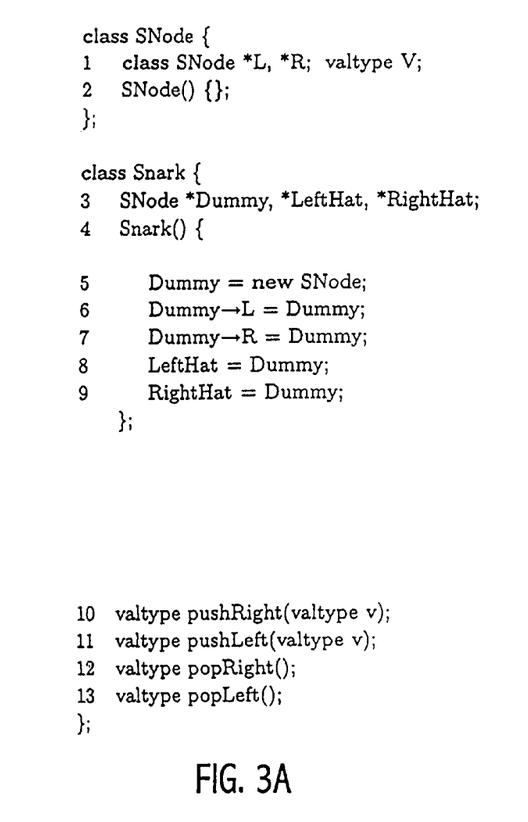
FIGS. 3A and 4A and FIGS. 3B and 4B illustrate corresponding aspects of an exemplary concurrent shared object implementation and a GC-independent implementation derived therefrom.
Figure 3B:
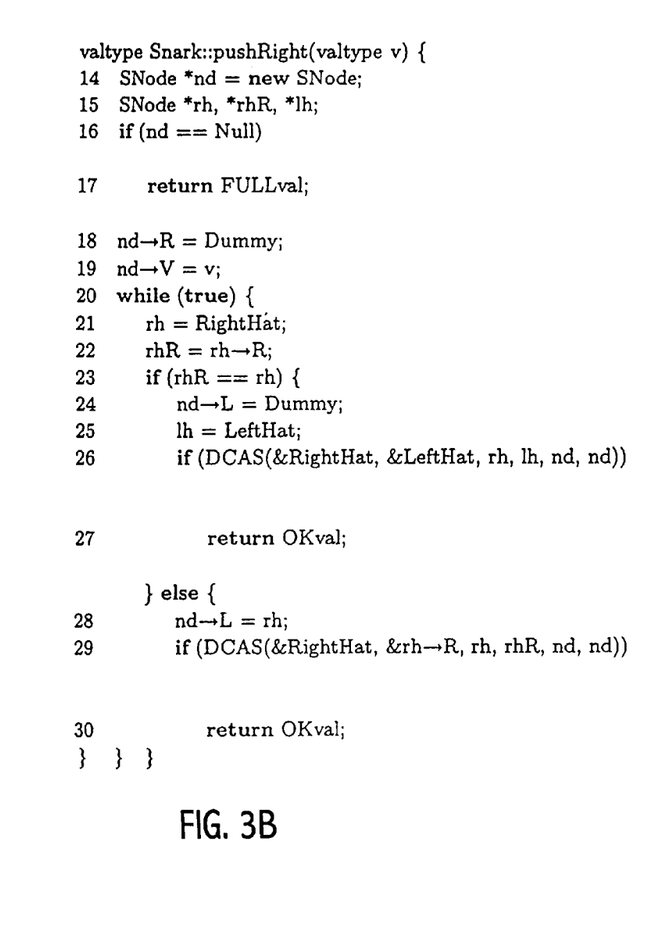
Figure 4A:
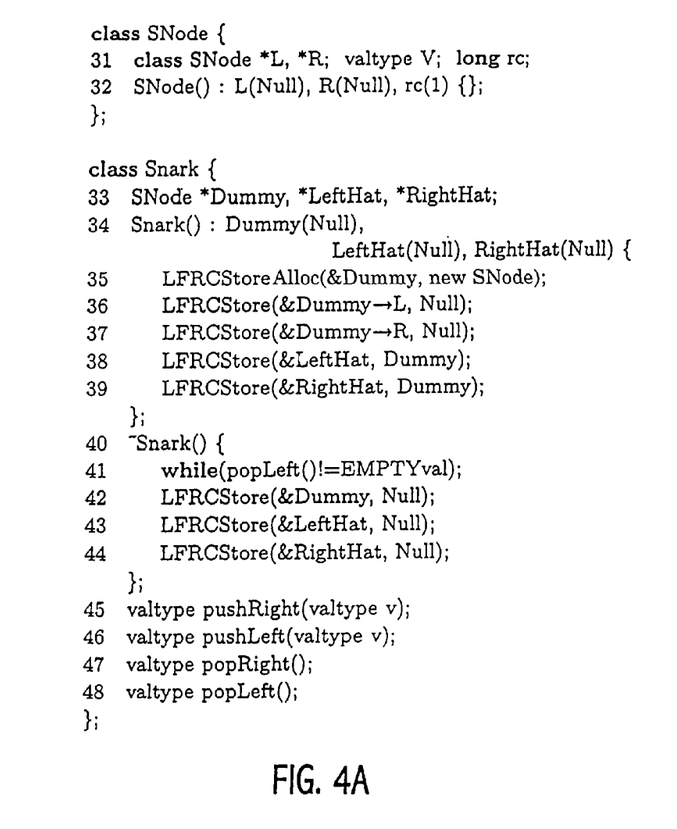
Figure 4B:
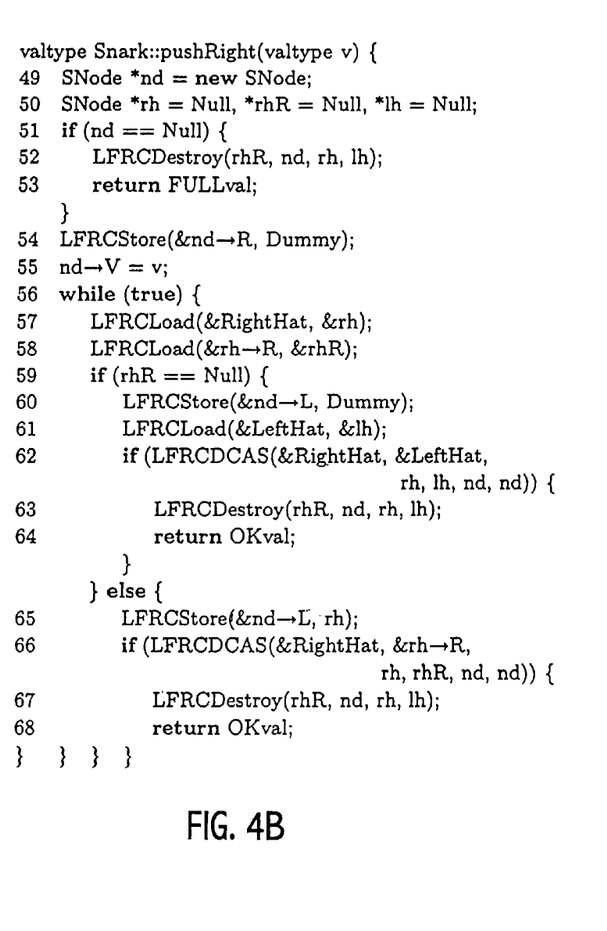

Some features of a Snark algorithm, data structure, access operation and/or implementation are summarized in the context of FIGS. 3A and 3B in preparation for explaining the application of the LFRC methodology thereto. In particular, C++ class declarations and code for one access operation, pushRight of a Snark implementation are shown in FIGS. 3A and 3B. A corresponding transformed implementation employing LFRC pointer operations is shown in FIGS. 4A and 4B. For clarity, uninteresting details such as access modifiers have been omitted.

Transformation of the pushRight access operation is illustrated in significant detail herein. Accordingly, based on the description herein, corresponding transformations of other Snark access operations, e.g., pushLeft, popRight and popLeft will be appreciated by persons of ordinary skill in the art. Indeed, a resultant set of access operations is described in the above-incorporated U.S. patent application Publication. Furthermore, U.S. Patent Application Publication No. U.S. 2001/0047361 A1, entitled "CONCURRENT SHARED OBJECT IMPLEMENTED USING A LINKED-LIST WITH AMORTIZED NODE ALLOCATION," naming Paul A. Martin, David L. Detlefs, Alexander T. Garthwaite, Guy L. Steele Jr. and Mark S. Moir as inventors, and filed on even date herewith, which is incorporated herein by reference, describes an explicit reclamation embodiment of another concurrent shared object implementation that was achieved by applying the methodology described herein.

In general, a Snark implementation represents a deque as a doubly-linked list. Nodes of the doubly-linked list are called SNodes (see lines 1–2, FIG. 3A). Nodes contain L and R pointers, which point to left and right neighbors, respectively. A Snark deque includes two "hat" pointers (LeftHat and RightHat), which respectively point to the leftmost and rightmost nodes in a non-empty deque, and a special "Dummy" node, which is used as a sentinel node at one or both ends of the deque (see line 3, FIG. 3A). A Snark constructor (see lines 4–9, FIG. 3A) allocates an SNode for Dummy, makes the L and R pointers of Dummy point to Dummy itself, and makes LeftHat and RightHat both point to Dummy. This is one representation of an empty deque in this implementation.

Self-pointers in the L and R pointers of the Dummy node are used to distinguish this node from nodes that are currently part of the deque. Some pop operations leave a previous deque node as a sentinel node. In this case, a pointer in this node is also directed toward the node itself to facilitate identification of the node as a sentinel. Pointers in the Snark algorithm are accessed only by loading them, storing them, and applying a DCAS operation to them. Additional detail is provided in the above-incorporated U.S. patent application.

Corresponding aspects of GC-independent code derived from the original Snark algorithm by using the LFRC methodology are shown in FIGS. 4A and 4B. FIGS. 3A and 4A and FIGS. 3B and 4B are presented in side-by-side fashion to illustrate the correspondence. Below, we briefly explain the differences between the two implementations and explain how we applied the LFRC methodology to the first implementation to derive the second. The explanation follows the transformation method outlined above.

1. We added a reference count field (rc) to the SNode object (see line 31, FIG. 4A). The SNode constructor sets the reference count to 1 (see line 32, FIG. 4A) to indicate that one pointer to the SNode exists (i.e., the pointer returned after allocation of storage by the constructor).
2. We wrote an LFRCDestroy function. One implementation of this function is shown below.

```
void LFRCDestroy(SNode *p) {
    if (p != Null && add_to_rc(p, -1)==1) {
        LFRCDestroy(p->L, p->R);
        delete p;
    }
}
``` where we use the notation LFRCDestroy (a, b, . . . ), both here and elsewhere, as shorthand for calling or otherwise invoking LFRCDestroy for each argument.

3. The Snark algorithm required a slight modification in order to ensure that garbage does not include reference cycles. As explained above, sentinel nodes (either the Dummy node, or a deque node that becomes a sentinel node after being popped) include self-pointers. The correctness of the Snark algorithm is not affected by changing these self-pointers to NULL pointers, and interpreting NULL pointers the same way the original algorithm interprets self-pointers. Because NULL pointers are not employed the original algorithm (see FIGS. 3A and 3B), each occurrence of a NULL pointer in the revised algorithm can be interpreted as a self-pointer. The result is that there are no cycles in garbage. To effect these changes, we changed the Snark constructor to set the Dummy node up with NULL pointers instead of self-pointers (see lines 36–37, FIG. 4A). In addition, we changed corresponding checks for self-pointers to checks for NULL pointers (see line 59, FIG. 4B). Finally, we changed the code in left and right pop operations (not shown) to install NULL pointers instead of self-pointers.

4. In this case, we did not have to do anything for Step 4, because the LFRC pointer operations (as presented in the next section) are already typed for Snark.
5. We replaced pointer accesses of the original algorithm (see FIGS. 3A and 3B) with LFRC pointer operations (see lines 35–39, 42–44, FIG. 4A and lines 54, 57–58, 60–62 and 65–66, FIG. 4B), in accordance with the transformations shown above.
6. We inserted calls to LFRCDestroy for each time a pointer variable is destroyed such as before returns from a function that contain local pointer variables (see lines 52, 63 and 67, FIG. 4B). In the notation of FIG. 4B, a call to LFRCDestroy with multiple arguments is shorthand for calling LFRCDestroy once with each argument. Also, we added initialization to NULL for all pointers (see lines 32 and 34, FIG. 4A and line 50, FIG. 4B). These initializations were not needed in the original algorithm, as the pointers are always modified before they are read. However, because LFRCS tore must reduce the reference count of the object previously pointed to by the pointer it modifies, it is important to ensure that pointers are initialized before accessing them with a LFRC pointer operation. Finally, we added a destructor operation for Snark objects, which pops any remaining values and writes NULL to the LeftHat, RightHat, and Dummy pointers before destroying the Snark object itself (see lines 40–44, FIG. 4A). This ensures that objects remaining in the deque are freed. Note that since the illustrated implementation of the destructor omits synchronization, it is not intended to be invoked concurrently with other deque operations. Accordingly, the Snark object should be destroyed only after all threads have finished accessing it.

Implementation of LFRC Pointer Operations

In the description that follows, we describe an illustrative implementation of LFRC pointer operations and explain why the illustrative operations ensure that there are no memory leaks and that memory is not freed prematurely. The LFRC pointer operations maintain a reference count in each object, which reflects the number of pointers to the object. When this count reaches zero, there are no more pointers to the object and the object can be freed.

The main difficulty is that we cannot atomically change a pointer variable from pointing to one object to pointing to another and update the reference counts of both objects. We overcome this problem with the observations that:

1. provided an object's reference counter is always at least the number of pointers to the object, it will never be freed prematurely, and
2. provided the count becomes zero when there are no longer any pointers to the object, there are no memory leaks.

Thus, we conservatively increment an object's reference count before creating a new pointer to it. If we subsequently fail to create that pointer, then we can decrement the reference count again afterwards to reflect that the new pointer was not created. An important mechanism in the illustrated implementation is the use of DCAS to increment an object's reference count while simultaneously checking that some pointer to the object exists. This avoids the possibility of updating an object after it has been freed, thereby potentially corrupting data in the heap, or in an object that has been reallocated.

We now describe a lock-free implementation of the LFRC pointer operations, beginning with an implementation of LFRCLoad as follows:

```
1  void LFRCLoad(SNode **A, SNode **dest) {
2      SNode *a, *olddest = *dest;
3      long r;
4      while (true) {
5          a = *A;
6          if (a == Null) {
7              *dest = Null;
8              break;
9          }
10         r = a->rc;
11         if (DCAS(A, &a->rc, a, r, a, r+1)) {
12             *dest = a;
13             break;
14         }
15     }
16     LFRCDestroy (olddest);
17 }
``` where LFRCLoad accepts two parameters, a pointer A to a shared pointer, and a pointer dest to a local pointer variable of the calling thread. The semantics of the LFRCLoad operation is to load the value in the location pointed to by A into the variable pointed to by dest. This has the effect of destroying one pointer (the previous value in the location pointed to by dest) and creating another (the new value of *dest). Thus, we must potentially update two reference counts. The LFRCLoad operation begins by recording the previous value of the pointer (line 2), so that it can be destroyed later. Note that we cannot destroy it yet, as this would risk destroying the object to which we are about to create a pointer.

Next, the LFRCLoad operation loads a new value from *A and, if the pointer read is non-NULL, increments the reference count of the object pointed to by *A In order to record that a new pointer to this object has been created. In this case, because the calling thread does not (necessarily) already have a pointer to this object, it is not safe to update the reference count using a simple CAS primitive. The object might be freed before the CAS executes, creating a risk that execution of the CAS modifies a location in a freed object or in an object that has subsequently been reallocated for another purpose. Therefore, the LFRCLoad operation uses a DCAS primitive to attempt to atomically increment the reference count, while ensuring that the pointer to the object still exists.

In the above implementation, these goals are achieved as follows. First, the LFRCLoad operation reads the contents of *A (line 5). If it sees a NULL pointer, there is no reference count to be incremented, so LFRCLoad simply sets *dest to NULL (lines 6–8). Otherwise, it reads the current reference count of the object pointed to by the pointer it read in line 5, and then attempts to increment this count using a DCAS (line 11) to ensure that the pointer to the object containing the reference count still exists. Note that there is no risk that the object containing the pointer being read by LFRCLoad is freed during the execution of LFRCLoad because the calling thread has a pointer to this object that is not destroyed during the execution of LFRCLoad. Accordingly, the reference count cannot fall to zero. If the DCAS succeeds, then the value read is stored (line 12) in the variable passed to LFRCLoad for this purpose. Otherwise, LFRCLoad retries. After LFRCLoad succeeds in either loading a NULL pointer, or loading a non-NULL pointer and incrementing the reference count of the object to which it points, it calls LFRCDestroy in order to record that the pointer previously in *dest has been destroyed (line 16).

An illustrative implementation of the LFRCDestroy operation will be understood as follows:

```
1  void LFRCDestroy(SNode *p) {
2      if (p != Null && add_to_rc(p, -1)==1) {
3          LFRCDestroy(p->L, p->R);
4          delete p;
5      }
6  }
```

If the LFRCDestroy operation's argument is non-NULL, then it decrements the reference count of the object pointed to by its argument (line 2, above). This is done using an add_to_rc function (such as that shown below) implemented using a CAS primitive. The add_to_rc function is safe (in the sense that there is no risk that it will modify a freed object) because it is called only in situations in which we know that the calling thread has a pointer to this object, which has previously been included in the reference count. Therefore, there is no risk that the reference count will become zero, thereby causing the object to be freed, before the add_to_rc function completes. If execution of the add_to_rc function causes the reference count to become zero, then we are destroying the last pointer to this object, so it can be freed (line 4, above). First, however, LFRCDestroy calls itself recursively (line 3, above) with each pointer in the object in order to update the reference counts of objects to which the soon-to-be-freed object has pointers.

```
1  long add_to_rc(SNode *p, int v) {
2      long oldrc;
3      while (true) {
4          oldrc = p->rc;
5          if (CAS(&p->rc), oldrc, oldrc+v)
6              return oldrc;
7      }
8  }
```

An LFRCStore operation can be implemented as follows:

```
1  void LFRCStore(SNode **A, SNode *v) {
2      SNode *oldval;
3      if (v != Null)
4          add_to_rc(v, 1);
5      while (true) {
6          oldval = *A;
7          if (CAS(A, oldval, v)) {
8              LFRCDestroy(oldval);
9              return;
10         }
11     }
12 }
``` where the LFRCStore operation accepts two parameters, a pointer A to a location that contains a pointer, and a pointer value v to be stored in this location. If the value v is not NULL, then the LFRCStore operation increments the reference count of the object to which v points (lines 3–4). Note that at this point, the new pointer to this object has not been created, so the reference count is greater than the number of pointers to the object. However, this situation will not persist past the end of the execution of the LFRCStore operation, since LFRCStore does not return until that pointer has been created. In the illustrated implementation, the pointer is created by repeatedly reading the current value of the pointer and using a CAS primitive to attempt to change the contents of the location referenced by A to the pointer value v (lines 5–9). When the CAS succeeds, we have created the pointer previously counted and we have also destroyed a pointer, namely the previous contents of *A. Therefore, LFRCStore calls LFRCDestroy (line 8) to decrement the reference count of the object to which the now-destroyed pointer points.

Finally, a LFRCDCAS operation can be implemented as follows:

```
1  boal LFRCDCAS(SNode **A0, SNode **A1,
2            SNode *old0, SNode *old1,
3            SNode *new0, SNode *new1) {
4      if (new0 != Null) add_to_rc(new0, 1);
5      if (new1 != Null) add_to_rc(new1, 1);
6      if (DCAS(A0, A1, old0, old1, new0, new1)) {
7          LFRCDestroy(old0, old1);
8          return true;
9      } else {
10         LFRCDestroy(new0, new1);
11         return false;
12     }
13 }
``` where the LFRCDCAS operation accepts six parameters, corresponding to the DCAS parameters described earlier. The illustrated implementation of the LFRCDCAS operation is similar to that of the LFRCStore operation in that it increments the reference counts of objects before creating new pointers to them (lines 4–5) using the add_to_rc function, thereby temporarily setting these counts artificially high. However, the LFRCDCAS operation differs from the LFRCStore operation in that it does not insist on eventually creating those new pointers. If the DCAS at line 6 fails, then LFRCDCAS calls LFRCDestroy for each of the objects whose reference counts were previously incremented, thereby compensating for the previous increments and then returning false (see lines 9–11). On the other hand, if the DCAS succeeds, then the previous increments were justified but we have destroyed two pointers, namely the previous values of the two locations updated by the DCAS. Therefore, the LFRCDCAS operation calls LFRCDestroy to decrement the reference counts of (and potentially free) the corresponding objects and then returns true (see lines 7–8). One suitable implementation of an LFRCCAS operation (not shown) is just a simplification of the LFRCDCAS with handling of the second location omitted.

While the above-described LFRCLoad, LFRCStore, LFRCDCAS and LFRCDestroy operations are sufficient for the illustrated implementation (or transformation) of a push-Right access operation for a concurrent shared object implementation of a deque, other access operations, other implementations and other concurrent shared objects may employ alternative or additional LFRC pointer operations. For example, in some implementations, an LFRCCopy operation may be useful. One implementation is as follows:

```
1  void LFRCCopy(SNode **v, SNode *w) {
2      if (w != Null)
3          add_to_rc(w,1);
4      LFRCDestroy(*v);
5      *v = w;
6  }
``` where the LFRC Copy operation accepts two parameters, a pointer v to a local pointer variable, and a value w of a local pointer variable. The semantics of this operation is to assign the value w to the variable pointed to by v. This creates a new pointer to the object referenced by w (if w is not NULL), so LFRCCopy increments the reference count of that object (lines 2–3). The LFRC-Copy operation also destroys a pointer, namely the previous contents of *v, so LFRCCopy calls LFRCDestroy (line 4) to decrement the reference count of the object referenced by the now-destroyed pointer. Finally, LFRCCopy assigns the value w to the pointer variable pointed to by v and returns.

Other LFRC operations that may be useful in some implementations include a variant of the previously described LFRCLoad operation suitable for use in situations where the target of the load cannot contain a pointer. For example, such a variation may be implemented as follows:

```
1  void LFRCLoad(SNode **A) {
2      Snode *a;
3      long r;
4      while (true) {
5          a = *A;
6          if (a == NULL);
7              return NULL;
8          r = a->rc;
9          if (DCAS(A,&a->rc,a,r,a,r+1))
10             return a;
11     }
12 }
```

Other suitable LFRC operations include the previously-described LFRCStoreAlloc operation, which may be implemented as follows:

```
1  void LFRCStoreAlloc(SNode **A, SNode *v) {
2      SNode *oldval;
3      while (true) {
4          oldval = *A;
5          if (CAS(A,oldval,v)) {
6              LFRCDestroy (oldval);
7              return;
8          }
9      }
10 }
``` in situations in which we want to invoke an allocation routine directly as the second parameter of a LFRC store operation. In addition, some implementations or transformations may include a variant of the LFRCDCAS operation such as the following:

```
1  bool LFRCDCAS1(SNode **a0, int *a1, SNode *old0, int old1,
2  SNode *new0, int new1) {
3
4      if (new0 != NULL)
5          add_to_rc(new0,1);
6
7      if (DCAS(a0,a1,old0,old1,new0,new1)) {   // Do DCAS
8          LFRCDestroy(old0);
9          return true;
10     } else {
11         LFRCDestroy(new0);
12         return false;
13     }
14 }
``` where the second location operated upon by the DCAS pointer operation contains a literal (e.g., an integer) rather than a pointer.

Some implementations or transformations may exploit other LFRC pointer operations such as the previously described LFRCPass operation, which may be implemented as follows:

```
1  SNode* LFRCPass(SNode *p) {
2      if (p !=NULL)
3          add_to_rc(p,1);
4      return p;
5  }
``` where the LFRCPass function may be employed to facilitate passing a pointer by value while appropriately maintaining a corresponding reference count. These and other variations on the illustrated set of LFRC pointer operations will be appreciated by persons of ordinary skill in the art based on the description herein.

While the invention has been described with reference to various embodiments, it will be understood that these embodiments are illustrative and that the scope of the invention is not limited to them. Terms such as always, never, all, none, etc. are used herein to describe sets of consistent states presented by a given computational system. Of course, persons of ordinary skill in the art will recognize that certain transitory states may and do exist in physical implementations even if not presented by the computational system. Accordingly, such terms and invariants will be understood in the context of consistent states presented by a given computational system rather than as a requirement for precisely simultaneous effect of multiple state changes. This "hiding" of internal states is commonly referred to by calling the composite operation "atomic", and by allusion to a prohibition against any process seeing any of the internal states partially performed.

Many variations, modifications, additions, and improvements are possible. For example, while application to a particular concurrent shared object (i.e., a deque) and a particular implementation thereof (i.e., a Snark realization) has been described in detail herein, applications to other shared objects and other implementations will also be appreciated by persons of ordinary skill in the art. In addition, more complex shared object structures may be defined that exploit the techniques described herein. Other synchronization primitives may be employed. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of claims that follow. In particular, allocations of pointer operation functionality to particular procedures, functions or methods are merely illustrative and other implementations may provide similar functionality in-line, using a different allocation of functionality to procedures, functions or methods, or through use of overloaded, object-specific pointer operations, smart pointers or other similar facility.

In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention as defined in the claims that follow.

The invention claimed is:

1. A method of providing storage reclamation in a multiprocessor computer system, the method comprising:
    maintaining respective reference counts for shared objects;
    accessing pointers to the shared objects using lock-free pointer operations to synchronize competing modifications of respective reference counts;
    freeing storage associated with a particular one of the shared objects only once the corresponding reference count indicates that the particular shared object is unreferenced.

2. The method of claim 1, wherein the lock-free pointer operations ensure that:
    if a number of pointers referencing the particular shared object is non-zero, then so too is the corresponding reference count; and
    if no pointers reference the particular shared object, then the corresponding reference count eventually becomes zero.

3. The method of claim 2,
    wherein at any given instant, a number of pointers to the particular shared object may differ from the corresponding reference count.

4. The method of claim 1, wherein the lock-free pointer operations include a load operation that loads a shared pointer value to a local pointer variable and employs:
    a double-compare-and-swap (DCAS) primitive to increment a reference count of a first shared object, if any, referenced by the shared pointer value while ensuring continued existence thereof; and
    a compare-and-swap (CAS) primitive to decrement a reference count of a second shared object, if any, referenced by a pre-load value of the local pointer variable.

5. The method of claim 1, wherein the pointer operations include a store operation that stores a local pointer value to a shared pointer variable and employs:
    a compare-and-swap (CAS) primitive to increment a reference count of a first shared object, if any, referenced by the local pointer value;
    a compare-and-swap (CAS) primitive to update the shared pointer variable with the local pointer value; and
    a compare-and-swap (CAS) primitive to decrement a reference count of a second shared object, if any, referenced by a pre-store value of the shared pointer variable.

6. The method of claim 1, wherein the pointer operations include a copy operation that copies a local pointer value to a local pointer variable and employs:
- a compare-and-swap (CAS) primitive to increment a reference count of a first shared object, if any, referenced by the local pointer value; and
- a compare-and-swap (CAS) primitive to decrement a reference count of a second shared object, if any, referenced by a pre-copy value of the local pointer variable.

7. The method of claim 1, wherein the pointer operations include a destroy operation that:
- decrements a reference count of a shared object identified by a supplied pointer value; and
- frees the identified shared object if the corresponding reference count has reached zero.

8. The method of claim 7,
wherein, prior to the freeing, the destroy operation recursively follows pointers defined in the shared object if the corresponding reference count has reached zero.

9. The method of claim 1, employed in access operations on a composite shared object that includes zero or more of the shared objects.

10. The method of claim 9,
wherein the composite shared object is embodied as a double ended queue (deque);
wherein the shared objects include nodes of the deque; and
wherein the access operations implement push and pop accesses at opposing ends of the deque.

11. The method of claim 10, wherein the push accesses employ:
- a pair of compare-and-swap (CAS) primitives to increment a reference count of a pushed node;
- a double compare-and-swap (DCAS) primitive to splice the pushed node onto the deque while mediating competing accesses to the deque;
- a pair of compare-and-swap (CAS) primitives to decrement the reference count of respective shared objects, if any, referenced by overwritten pre-splice pointer values.

12. The method of claim 11, wherein the pairs of compare-and-swap (CAS) primitives and the double compare-and-swap (DCAS) primitive are all encapsulated within one or more functions that implement an LFRCDCAS pointer operation.

13. A lock-free implementation of a concurrent shared object comprising:
- plural component shared objects encoded in dynamically-allocated shared storage;
- and access operations that, prior to attempting creation or replication of a pointer to any of the component shared objects, increment a corresponding reference count, and upon failure of the attempt, thereafter decrement the corresponding reference count, the access operations decrementing a particular reference count, except when handling a pointer creation failure, no earlier than upon destruction of a pointer to a corresponding one of the component shared objects.

14. The lock-free implementation of a concurrent shared object as recited in claim 13, wherein the access operations employ lock-free, reference-count-maintaining pointer operations.

15. The lock-free implementation of a concurrent shared object as recited in claim 13, wherein the access operations include one or more of:
- a lock-free, reference-count-maintaining load operation;
- a lock-free, reference-count-maintaining store operation;
- a lock-free, reference-count-maintaining copy operation;
- a lock-free, reference-count-maintaining destroy operation;
- a lock-free, reference-count-maintaining compare-and-swap (CAS) operation; and
- a lock-free, reference-count-maintaining double compare-and-swap (DCAS) operation.

16. The lock-free implementation of a concurrent shared object as recited in claim 13, wherein each of the access operations are lock-free.

17. The lock-free implementation of a concurrent shared object as recited in claim 13, wherein the access operations employ either or both of a compare-and-swap (CAS) primitive and a double compare-and-swap (DCAS) primitive.

18. The lock-free implementation of a concurrent shared object as recited in claim 13, wherein the access operations employ emulations of either or both of the compare-and-swap and double-compare-and-swap operations.

19. The lock-free implementation of a concurrent shared object as recited in claim 18, wherein the emulation is based on one of:
- a load-linked/store-conditional operation pair; and
- transactional memory.

20. The lock-free implementation of a concurrent shared object as recited in claim 13,
wherein the incrementing and decrementing are performed using a synchronization primitive.

21. The lock-free implementation of a concurrent shared object as recited in claim 13,
wherein the concurrent shared object includes a doubly-linked list; and
wherein the access operations are performed using a synchronization primitive to mediate concurrent execution thereof.

22. A computer program product encoded in at least one computer readable medium, the computer program product comprising:
- a representation of a shared object that is instantiable as zero or more component objects in dynamically-allocated shared storage of a multiprocessor;
- at least one instruction sequence executable by respective processors of the multiprocessor, the at least one instruction sequence implementing at least one access operation on the shared object and employing one or more lock-free pointer operations to synchronize competing modifications of reference counts for one or more accessed component objects thereof; and
- the at least one instruction sequence further implementing explicit reclamation of the component objects, thereby freeing storage associated with a particular one of the component objects only once the corresponding reference count indicates that the particular component object is unreferenced.

23. The computer program product of claim 22,
wherein the zero or more component objects of the shared object are organized as a linked-list; and
wherein the at least one access operation supports concurrent access to the linked-list.

24. The computer program product of claim 22, at least partially implementing a mutator that provides explicit reclamation of the dynamically-allocated shared storage.

25. The computer program product of claim 22, at least partially implementing a garbage collector that reclaims shared storage dynamically-allocated for a mutator and, which employs the shared object in coordination thereof.

26. The computer program product of claim 22,
wherein the at least one computer readable medium is selected from the set of a disk, tape or other magnetic, optical, or electronic storage medium and a network.

27. An apparatus comprising:
plural processors;
one or more stores addressable by the plural processors;
one or more shared pointer variables accessible by each of the plural processors for referencing a shared object encoded in the one or more stores;
means for coordinating competing access to the shared object using one or more reference counts and pointer manipulations that employ one or more lock-free pointer operations to ensure that if the number of pointers to the shared object is non-zero, then so too is the corresponding reference count and further that if no pointers reference the shared object, then the corresponding reference count eventually becomes zero.

28. The apparatus of claim 27, further comprising:
means for freeing the shared object only once the corresponding reference count indicates that the shared object is unreferenced.

* * * * *

UNITED STATES PATENT AND TRADEMARK OFFICE
CERTIFICATE OF CORRECTION

PATENT NO.          : 6,993,770 B1
APPLICATION NO. : 09/837671
DATED                   : January 31, 2006
INVENTOR(S)        : David L. Detlefs et al.

It is certified that error appears in the above-identified patent and that said Letters Patent is hereby corrected as shown below:

In Column 6, line 35, replace "==" with -- = = -- (both occurrences);

In Column 10, line 59, replace "atormically" with --atomically--;

In Column 13, line 46, replace "==" with -- = = --;

In Column 14, line 26, replace "LFRCS tore" with --LFRCStore--;

In Column 15, line 16, replace "==" with -- = = --;

In Column 16, line 14, replace "==" with -- = = --;

In Column 17, line 23, replace "boal" with --bool--;

In Column 18, line 13, replace "LFRC Copy" with --LFRCCopy--;
            line 36, replace "Snode" with --SNode--;
            line 40, replace "==" with -- = = --;

Signed and Sealed this

Fifteenth Day of August, 2006

JON W. DUDAS
*Director of the United States Patent and Trademark Office*